Dec. 6, 1932.  R. J. SOULIGNE  1,890,024
SUPPLY CONTROLLING FLOAT FOR MILK DRYING MACHINES
Filed Nov. 16, 1931
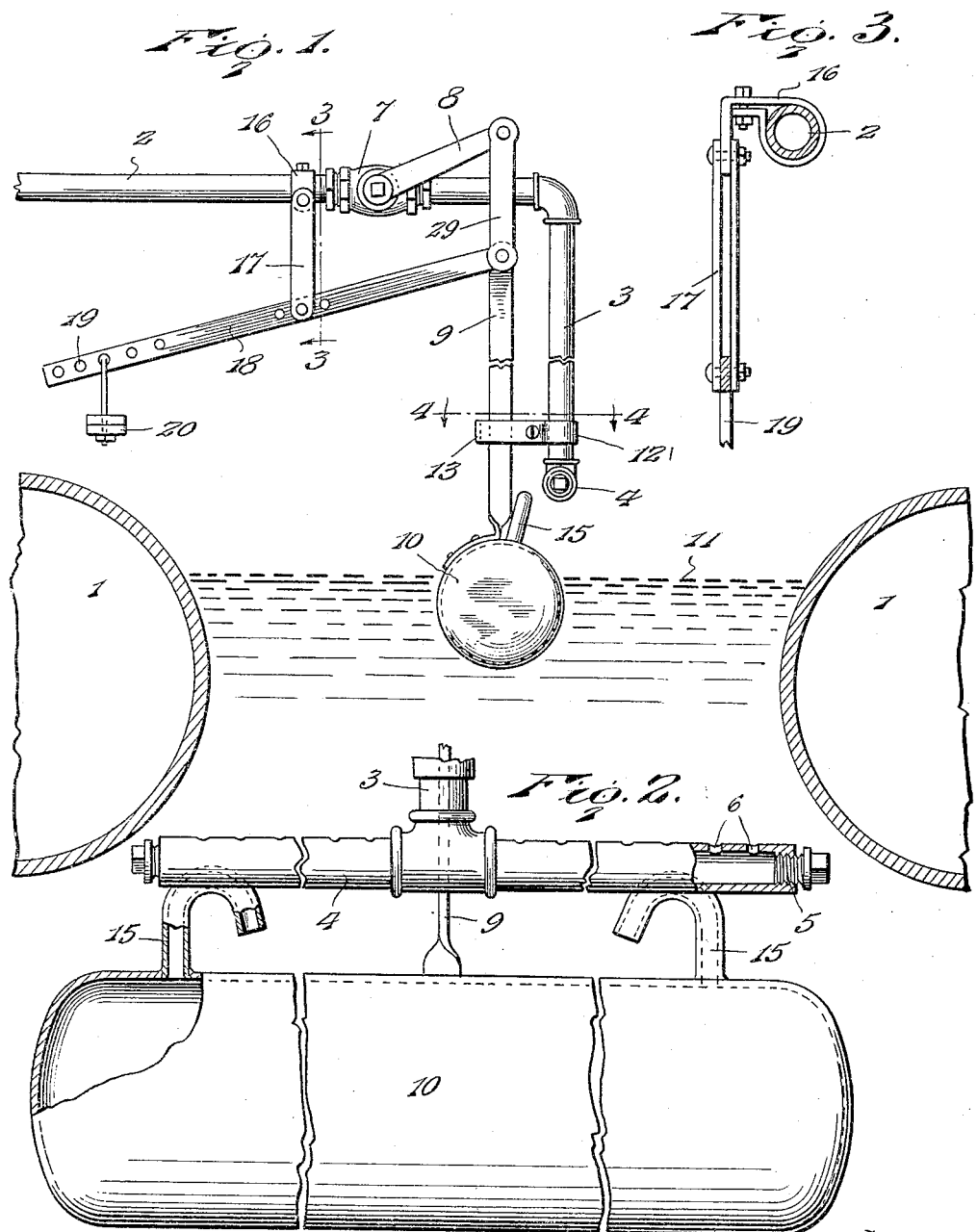
Inventor
Raymond J. Souligne.
By Lacey & Lacey
Attorneys Patented Dec. 6, 1932

1,890,024

UNITED STATES PATENT OFFICE

RAYMOND J. SOULIGNE, OF GOODLAND, INDIANA

SUPPLY-CONTROLLING FLOAT FOR MILK DRYING MACHINES

Application filed November 16, 1931. Serial No. 575,427.

This invention has for its object the provision of means whereby the level of milk in a milk-drying machine may be maintained approximately constant. Machines are now in use for drying milk and buttermilk to produce a powder which has considerable commercial value. These milk-drying machines embody two cylinders or rolls which rotate toward each other and which are heated to a high degree by the admission of steam thereto. If the level of the milk between or on these rollers is permitted to rise too high, the milk flows over the rollers and is lost, passing out to the drainage outlets which are provided in connection with the machine. If the level of the milk gets too low, the product is either burnt or is carried off in a pasty condition which is not commercially desirable. The object of the present invention is to provide automatic means whereby the level of the milk will be kept approximately constant and the objectionable results noted will be avoided. The invention is illustrated in the accompanying drawing and will be hereinafter fully set forth and particularly defined.

In the drawing,

Figure 1 is a view, partly in section and partly in elevation, showing my improved governing device in operative position, Fig. 2 is a front elevation of the float, and the milk-discharge pipe, with parts in section, Fig. 3 is an enlarged vertical section on the line 3—3 of Fig. 1, Fig. 4 is a detail horizontal section on the line 4—4 of Fig. 1.

In the drawing, the reference numeral 1 indicates portions of the drying rollers which are illustrated in a conventional manner and, in themselves, form no part of the present invention. The milk to be dried is brought into the drying machine through a pipe 2 which leads from the source of supply and is carried downwardly, as shown at 3, to a point between the rollers where it is coupled to a cross pipe 4 having plugged ends, as shown at 5, and provided in its upper side with openings 6 extending from end to end thereof. This cross pipe 4 is equal in length to the drying rollers so that the milk discharged therefrom will be delivered over an area corresponding with the surfaces of the drying rollers between the ends of the same. Within the pipe 2 there is fitted a cut-off valve of any approved type, indicated conventionally at 7, the stem of the valve projecting through the valve casing and the valve preferably being of a well known turning-plug form. Secured upon the end of the valve stem is a crank or lever 8 to the end of which is pivoted a hanger 9 which depends adjacent the downturned branch 3 of the supply pipe and extends below the cross pipe 4, as shown in Fig. 1. To the lower end of the hanger 9 is secured a float 10 which is preferably in the form of a hollow cylinder of aluminum or some other metal which will resist the action of the acids in the milk and will also withstand the high temperature present within the drying machine. This float is disposed just below the cross delivery pipe 4 and will, of course, rise and fall with the level of the liquid, which is indicated at 11. Secured about the pipe 3, adjacent the lower end thereof, is a clamp 12 from which extends an arm 13 which has its outer end doubled upon itself, as shown at 14, in Fig. 4, so that it spans the hanger 9 and guides the same in its movement whereby to maintain it in a vertical plane and in a rectilinear path. Rocking of the float is thereby avoided and it will more accurately respond to fluctuations in the level of the liquid. Vent pipes 15 rise from the float, near the ends thereof, and the upper open ends of these vent pipes are turned downwardly, as shown clearly in Fig. 2, whereby the heated air within the float may escape and expansion and contraction of the float will be minimized. The downturned ends of the vent pipes will prevent the inflowing milk from entering the pipes and thereby finding access to the interior of the float to affect its operation. A clamp bracket 16 is secured upon the supply pipe 2, at a suitable point in the length of the same, and generally will be mounted adjacent the cut-off valve 7. To this bracket 16 are secured depending links 17 and to the lower ends of said links is pivoted a lever 18 which has one end pivoted to the hanger 9 and its opposite end provided with a plurality of openings 19 in any one of which a counter weight 20 may be suspended. The lever 18 may be pivoted to and between the lower ends of the links 17 at different points within reasonable limits and by suspending the counter weight 20 in the proper opening 19, a very accurate control of the float will be attained. This lever and its counter weight serve as a governor for the action of the float so that it will respond quickly to variations in the level of the liquid which is subjected to the action of the drying rollers. A link 29 is pivoted to the ends of the lever 18 and the crank to balance the upper end portion of the hanger 9 and aid in maintaining steadiness in the movements of the parts.

From the foregoing description, taken in connection with the accompanying drawing, it will be understood that when the level of the liquid rises to a predetermined height, the float will be lifted to such an extent that the crank 8 will rock the turning plug of the regulating valve 7 and will cut off the further flow of the liquid until enough of the liquid has been dried and carried out to decrease the level whereupon the float will, of course, drop and the valve will be opened to permit flow until the desired upper limit of the level is again reached. The device is exceedingly simple and inexpensive and, in actual use, has been found to be highly efficient.

Having thus described the invention, I claim,

The combination with a liquid supply pipe having a downturned discharge end, and a regulating valve fitted in the pipe to control the flow of liquid therethrough, of a crank connected with the valve for setting the same, a hanger pivoted to the crank, a float carried by the lower end of the hanger and disposed in the body of liquid discharged from the pipe, a guide bracket mounted on the downturned portion of the supply pipe and spanning the hanger, a link suspended on the supply pipe, and a lever fulcrumed between its ends at the lower end of said link and having one end pivoted to the hanger and its opposite end provided with a counter weight.

In testimony whereof I affix my signature.

RAYMOND J. SOULIGNE. [L. S.]